United States Patent
Inoue et al.

(10) Patent No.: US 8,883,920 B2
(45) Date of Patent: Nov. 11, 2014

(54) RESIN COMPOSITION AND MULTILAYER STRUCTURAL BODY EMPLOYING THE SAME

(75) Inventors: Noriyoshi Inoue, Osaka (JP); Hideshi Onishi, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 161 days.

(21) Appl. No.: 13/582,793

(22) PCT Filed: Mar. 10, 2011

(86) PCT No.: PCT/JP2011/055714
§ 371 (c)(1),
(2), (4) Date: Sep. 5, 2012

(87) PCT Pub. No.: WO2011/111803
PCT Pub. Date: Sep. 15, 2011

(65) Prior Publication Data
US 2012/0328866 A1 Dec. 27, 2012

(30) Foreign Application Priority Data

Mar. 10, 2010 (JP) .................................. 2010-052945

(51) Int. Cl.
| | | |
|---|---|---|
| *C08L 29/00* | (2006.01) | |
| *C08L 29/04* | (2006.01) | |
| *C08L 33/06* | (2006.01) | |
| *B32B 27/28* | (2006.01) | |
| *C08L 51/04* | (2006.01) | |
| *C08L 63/00* | (2006.01) | |
| *C08L 71/02* | (2006.01) | |
| *B32B 27/08* | (2006.01) | |
| *B32B 27/32* | (2006.01) | |
| *B32B 27/30* | (2006.01) | |
| *C08J 5/18* | (2006.01) | |

(52) U.S. Cl.
CPC .................. *B32B 27/08* (2013.01); *B32B 27/32* (2013.01); *C08L 29/04* (2013.01); *C08L 71/02* (2013.01); *B32B 27/306* (2013.01); *C08J 5/18* (2013.01); *C08J 2400/26* (2013.01); *B32B 2250/02* (2013.01); *B32B 2250/24* (2013.01); *B32B 2307/558* (2013.01); *B32B 2307/7244* (2013.01); *C08J 2329/04* (2013.01); *C08J 2451/08* (2013.01); *C08J 2451/04* (2013.01); *C08L 51/04* (2013.01)
USPC .............................. 525/57; 525/88; 525/92 A

(58) Field of Classification Search
USPC ................. 525/57, 88, 92 A, 64, 65
See application file for complete search history.

(56) References Cited

U.S. PATENT DOCUMENTS

| 5,498,656 A | * | 3/1996 | Morita et al. ................. 524/140 |
| 2004/0204530 A1 | | 10/2004 | Masuda et al. |
| 2008/0281045 A1 | | 11/2008 | Zhang |

FOREIGN PATENT DOCUMENTS

| EP | 480769 | 4/1992 |
| EP | 1466724 | 10/2004 |
| JP | 49-117536 | 11/1974 |
| JP | 50-18553 | 2/1975 |
| JP | 51-56847 | 5/1976 |
| JP | 4-149257 | 5/1992 |
| JP | 6-106687 | 4/1994 |
| JP | 9-263666 | 10/1997 |
| JP | 11-333990 | 12/1999 |
| JP | 2000-143964 | * 5/2000 |
| JP | 2005-29727 | 2/2005 |
| WO | 2008/141029 | 11/2008 |

OTHER PUBLICATIONS

Ishizuka et al., partial electronic translation of JP 2000-143964.*
Search report from E.P.O., mail date is Aug. 1, 2013.
Search report from International Application No. PCT/JP2011/055714, mail date is Jun. 14, 2011.
International Preliminary Report on Patentability and Written Opinion for International Application No. PCT/JP2011/055714, mail date is Oct. 2, 2012.

* cited by examiner

*Primary Examiner* — Jeffrey Mullis
(74) *Attorney, Agent, or Firm* — Greenblum & Bersntein, P.L.C.

(57) ABSTRACT

The present invention provides a resin composition which comprises: (A) a saponifed ethylene-vinyl ester copolymer; (B) a rubber-like graft polymer; and (C) a polyalkylene ether unit-containing polymer. The inventive resin composition, which employs the saponfied ethylene-vinyl ester copolymer, is excellent in impact resistance.

11 Claims, No Drawings

RESIN COMPOSITION AND MULTILAYER STRUCTURAL BODY EMPLOYING THE SAME

TECHNICAL FIELD

The present invention relates to a resin composition excellent in solvent resistance and impact resistance, and to a multilayer structural body employing the same. Particularly, the invention relates to a resin composition containing a saponified ethylene-vinyl ester copolymer and to a multilayer structural body employing the same.

BACKGROUND ART

Saponified ethylene-vinyl ester copolymers of the prior art are excellent in transparency, gas barrier property, aroma retaining property and the like, and are generally used as packaging materials. Further, the saponfied ethylene-vinyl ester copolymer are also excellent in antistatic property, oil resistance and solvent resistance and, therefore, are useful as materials for containers such as bottles, tanks and drums for fuels, agricultural agents and other solutions containing volatile substances, and hoses and the like for transporting these liquids.

The saponfied ethylene-vinyl ester copolymer are excellent in gas barrier property because of their abundant hydroxyl groups but, at the same time, highly crystalline. Therefore, the saponified ethylene-vinyl ester copolymer tends to be poorer in impact resistance, suffering from cracking.

A resin composition prepared by blending specific multilayer structure polymer particles in such an saponfied ethylene-vinyl ester copolymer is known as being excellent in impact resistance and surface gloss (see, for example, PLT 1).

CITATION LIST

Patent Literature

PLT1: JP-HEI9 (1997)-263666-A

SUMMARY OF INVENTION

However, the prior art described above requires improvement in impact resistance. This may be because affinity between the saponified ethylene-vinyl ester and the multilayer structure polymer particles is poor.

In view of the foregoing, the inventors of the present invention conducted intensive studies and, as a result, found that a resin composition excellent in impact resistance can be provided by using a resin composition containing: (A) a saponified ethylene-vinyl ester copolymer; (B) a rubber-like graft polymer; and (C) a polyalkylene ether unit-containing polymer.

According to the present invention, there is provided a resin composition comprising: (A) a saponified ethylene-vinyl ester copolymer; (B) a rubber-like graft polymer; and (C) a polyalkylene ether unit-containing polymer.

The use of the resin composition containing the saponified ethylene-vinyl ester copolymer (A), the rubber-like graft polymer (B) and the polyalkylene ether unit-containing polymer (C) provides unexpected remarkable effects, i.e., excellent impact resistance at ordinary temperatures and excellent impact resistance under lower temperature conditions.

In the present invention, the use of the rubber-like graft polymer (B) excellent in dispersibility in the saponfied ethylene-vinyl ester copolymer (A) makes it possible to efficiently disperse the rubber-like graft polymer (B) in the matrix component (A) of the resin composition. Further, interface areas between the component (A) and the component (B) are increased, so that the impact absorbing efficiency of the component (B) can be increased to thereby improve the impact resistance.

The polyalkylene ether unit-containing polymer (C) having affinity for the component (A) coexists in the composition, whereby the unexpected remarkable effects are provided, i.e., the resin composition has a remarkably improved impact resistance and an excellent low-temperature impact resistance. This may be because the matrix per se has an improved impact resistance and, at the same time, the efficiency of impact transfer from the matrix to the component (B) is increased.

Where the polyalkylene ether unit-containing polymer (C) is a polyester-polyether block copolymer, the component (C) has more excellent dispersibility in the matrix.

Where the polyalkylene ether unit-containing polymer (C) contains a carboxyl group, the resin composition is more excellent in impact resistance.

Where a weight ratio (A/B) between the saponified ethylene-vinyl ester copolymer (A) and the rubber-like graft polymer (B) is 70/30 to 99/1, the resin composition is more excellent in impact resistance and gas barrier property.

Where a weight ratio (B/C) between the rubber-like graft polymer (B) and the polyalkylene ether unit-containing polymer (C) is 0.1 to 10, the resin composition is excellent in low-temperature impact resistance, and is more excellent in solvent resistance.

Where a weight ratio (A/C) between the saponified ethylene-vinyl ester copolymer (A) and the polyalkylene ether unit-containing polymer (C) is 70/30 to 99/1, the resin composition is more excellent in impact resistance and gas barrier property.

Where the rubber-like graft polymer (B) is a graft polymer prepared by graft-polymerizing 10 to 90 wt % of a vinyl monomer (B2) in the presence of 10 to 90 wt % of a rubber-like polymer (B1) based on a total amount of 100 wt % of the rubber-like polymer (B1) and the vinyl monomer (B2), the resin composition is more excellent in impact resistance and workability.

Where the rubber-like polymer (B1) has a glass transition temperature of not higher than 0° C., the resin composition is more excellent in impact resistance.

Where the resin composition comprises a glycidyl-group-containing (meth)acrylate polymer (D) together with the components (A) to (C), the resin composition properly exhibits the impact resistance and the gas barrier property.

Where the glycidyl-group-containing (meth)acrylate polymer (D) has an epoxy equivalent of 50 to 5000 g/eq, the resin composition is more excellent in impact resistance.

A multilayer structural body including at least one layer made of the inventive resin composition has an improved mechanical strength.

Where the multilayer structural body has an overall thickness of 20 to 50000 μm, the multilayer structural body is excellent in impact resistance and gas barrier property.

DESCRIPTION OF EMBODIMENTS

The present invention will hereinafter be described in detail by way of preferred embodiments.

According to the present invention, a resin composition is provided, which comprises: (A) a saponified ethylene-vinyl ester copolymer (hereinafter often referred to as "EVOH"); (B) a rubber-like graft polymer; and (C) a polyalkylene ether unit-containing polymer.

<Description of EVOH (A)>

The EVOH (A) to be used in the present invention will be described.

The EVOH (A) to be used in the present invention is a known water-insoluble thermoplastic resin. The EVOH (A) is typically prepared by copolymerizing a vinyl ester monomer (e.g., a fatty acid vinyl ester) and ethylene and saponifying the resulting ethylene-vinyl ester copolymer. That is, the EVOH (A) mainly contains an ethylene structural unit and a vinyl alcohol structural unit, and further contains a small amount of a vinyl ester structural unit which remains after the saponification. A known polymerization method such as a solution polymerization method may be employed for the copolymerization.

From the viewpoint of economy, vinyl acetate is generally used as the vinyl ester monomer. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate, and aromatic vinyl esters such as vinyl benzoate. Typically, an aliphatic vinyl ester having a carbon number of 3 to 20, preferably 4 to 10, particularly preferably 4 to 7, is used. These vinyl ester monomers are typically used alone but, as required, may be used in combination.

The ethylene content of the EVOH (A) is determined when ethylene and the vinyl ester monomer are polymerized, and is not changed by the saponification. The proportion of the ethylene structural unit is typically 20 to 60 mol %, preferably 20 to 55 mol %, particularly preferably 25 to 50 mol %, as measured in conformity with ISO14663. If the ethylene content is excessively low, the impact resistance and the workability tend to be reduced. If the ethylene content is excessively high, the gas barrier property and the solvent resistance tend to be reduced.

The saponification degree of the EVOH (A) is typically 90 to 100 mol %, preferably 95 to 100 mol %, particularly preferably 98 to 100 mol %, as measured by a titration method (JIS K6726) (with the use of a solution in which the EVOH is homogeneously dissolved in a water/ethanol solvent). If the saponification degree is excessively low, the oxygen barrier property tends to be reduced.

The melt flow rate (hereinafter often referred to as "MFR") of the EVOH (A) is typically 0.1 to 100 g/10 minutes, preferably 1 to 50 g/10 minutes, particularly preferably 2 to 40 g/10 minutes, as measured at 210° C. with a load of 2160 g. If the melt flow rate is excessively high or low, the workability tends to be reduced.

In the present invention, a copolymerizable ethylenically unsaturated monomer may be used in addition to ethylene and the fatty acid vinyl ester for the copolymerization, as long as the properties required for the EVOH (A) are not impaired. Examples of the monomer include olefins such as propylene, 1-butene and isobutene, hydroxyl-containing α-olefins such as 2-propen-1-ol, 3-buten-1-ol, 4-penten-1-ol, 5-hexene-1-ol, 3,4-dihydroxy-1-butene and 5-hexene-1,2-diol, and esterification products thereof, e.g., 3,4-diacyloxy-1-butene, particularly 3,4-diacetoxy-1-butene. Other examples of the monomer include unsaturated acids such as acrylic acid, methacrylic acid, crotonic acid, (anhydrous) phthalic acid, (anhydrous) maleic acid and (anhydrous) itaconic acid, and salts thereof and $C_{1-18}$ monoalkyl or dialkyl esters thereof. Further other examples of the monomer include acrylamides such as acrylamide, $C_{1-18}$ N-alkylacrylamides, N,N-dimethylacrylamide, 2-acrylamidepropanesulfonic acid and salts thereof, and acrylamidepropyldimethylamine, acid salts thereof and quaternary salts thereof, methacrylamides such as methacrylamide, $C_{1-18}$ N-alkylmethacrylamides, N,N-dimethylmethacrylamide, 2-methacrylamidepropanesulfonic acid and salts thereof, and methacrylamidepropyldimethylamine, acid salts thereof and quaternary salts thereof. Still other examples of the monomer include N-vinylamides such as N-vinylpyrrolidone, N-vinylformamide and N-vinylacetamide, cyanided vinyl compounds such as acrylonitrile and methacrylonitrile, vinyl ethers such as $C_{1-18}$ alkyl vinyl ethers, hydroxyalkyl vinyl ethers and alkoxyalkyl vinyl ethers, halogenated vinyl compounds such as vinyl chloride, vinylidene chloride, vinyl fluoride, vinylidene fluoride and vinyl bromide, vinylsilanes such as trimethoxyvinylsilane, and allyl acetate, allyl chloride, trimethyl-(3-acrylamide-3-dimethylpropyl)ammonium chloride, acrylamide-2-methylpropanesulfonic acid, vinylethylene carbonate and glycerol monoallyl ether. These monomers may be subjected to "post modification" such as urethanation, acetalation, cyanoethylation and oxyalkylenation.

Particularly, an EVOH (A) prepared through copolymerization of any of the hydroxyl-containing α-olefins is preferred because of excellent secondary formability (e.g., stretchability, vacuum/pressure formability), and an EVOH (A) having 1,2-diol at its side chain is particularly preferred.

The EVOH (A) to be used in the present invention may contain additives to be generally blended in the EVOH, as long as the effects of the present invention are not impaired. Examples of the additives include a heat stabilizer, an antioxidant, an antistatic agent, a colorant, a UV absorber, a lubricant, a plasticizer, a light stabilizer, a surfactant, an antibacterial agent, a desiccant, an antiblocking agent, a flame retarder, a crosslinking agent, a curing agent, a foaming agent, a crystal nucleating agent, an antifogging agent, a biodegradation additive, a silane coupling agent and an oxygen scavenger.

The heat stabilizer is added to improve physical properties such as heat stabilizing property in a melt-forming process. Examples of the heat stabilizer include organic acids such as acetic acid, propionic acid, butyric acid, lauric acid, stearic acid, oleic acid and behenic acid, and alkali metal salts (sodium, potassium and like salts) thereof, alkali earth metal salts (calcium, magnesium and like salts) thereof; and inorganic acids such as sulfuric acid, sulfurous acid, carbonic acid, phosphoric acid and boric acid, and alkali metal salts (sodium, potassium and like salts) thereof, alkali earth metal salts (calcium, magnesium and like salts) thereof, zinc salts thereof, and other salts thereof. Among these, any of acetic acid, boron compounds including boric acid and borates, acetates and phosphates is preferably added.

Where acetic acid is added, the addition amount of acetic acid is typically 0.001 to 1 parts by weight, preferably 0.005 to 0.2 parts by weight, particularly preferably 0.010 to 0.1 parts by weight, based on 100 parts by weight of the EVOH (A). If the addition amount of acetic acid is excessively small, the effects of the addition of acetic acid are not sufficiently provided. On the other hand, if the addition amount of acetic acid is excessively great, it is difficult to provide a uniform film.

Where a boron compound is added, the addition amount of the boron compound is typically 0.001 to 1 parts by weight, preferably 0.002 to 0.2 parts by weight, particularly preferably 0.005 to 0.1 parts by weight, based on 100 parts by weight of the EVOH (A) as measured on a boron basis (through analysis by ICP emission spectrometry after ashing). If the addition amount of the boron compound is excessively small, the effects of the addition of the boron compound are not sufficiently provided. On the other hand, if the addition amount of the boron compound is excessively great, it is difficult to provide a uniform film.

The amount of an acetate or a phosphate (including a hydrogen phosphate) to be added is typically 0.0005 to 0.1 parts by weight, preferably 0.001 to 0.05 parts by weight, particularly preferably 0.002 to 0.03 parts by weight, based on 100 parts by weight of the EVOH (A) as measured on a metal basis (through analysis by ICP emission spectrometry after ashing). If the addition amount is excessively small, the effects of the addition are not sufficiently provided. On the other and, if the addition amount is excessively great, it is difficult to provide a uniform film. Where two or more salts are added to the EVOH (A), the total amount of the salts is preferably within the aforementioned range of the addition amount.

The method of adding any of acetic acid, the boron compounds, the acetates, the phosphates and the alkali metal salts is not particularly limited, but exemplary methods include: i) a method in which a porous deposition product of the EVOH (A) having a moisture content of 20 to 80 wt % is brought into contact with an aqueous solution of any of the additives to be impregnated with the aqueous solution and then dried; ii) a method in which any of the additives is added to a homogeneous solution (water/alcohol solution) of the EVOH (A) and then the resulting mixture is extruded in a coagulation solution into strands which are in turn cut into pellets and dried; iii) a method in which the EVOH (A) and any of the additives are mixed together and the resulting mixture is melt and kneaded by an extruder or the like; and iv) a method in which alkali (sodium hydroxide, potassium hydroxide or the like) used for the saponification in the production of the EVOH (A) is neutralized with an organic acid such as acetic acid, and the amount of the remaining organic acid (acetic acid) and the amount of a salt produced by a side reaction are controlled by rinsing with water.

For more remarkable effects of the present invention, the method i) or ii) is preferred which ensures excellent dispersion of the additives. Where an organic acid or a salt thereof is to be contained, the method iv) is preferred.

<Description of Rubber-Like Graft Polymer (B)>

The rubber-like graft polymer (B) to be used in the present invention is a graft polymer prepared by polymerizing a vinyl monomer (B2) in the presence of a rubber-like polymer (B1). The polymer is in a particulate form having a core-shell structure including a core of the rubber-like polymer (B1) and a shell of the vinyl monomer (B2).

Usable examples of the rubber-like polymer (B1) include known rubber-like polymers such as a butadiene rubber-like polymer, a silicone rubber-like polymer and an acryl rubber-like polymer. For more excellent impact resistance, these rubber-like polymers (B1) typically each have a glass transition temperature (hereinafter sometimes referred to as "Tg") of not higher than 0° C., preferably not higher than −10° C., more preferably not higher than −30° C. Where the rubber-like polymer has a plurality of glass transition temperatures, it is preferred that at least one of the glass transition temperatures is within the aforementioned range, and it is particularly preferred that all of the glass transition temperatures are within the aforementioned range. These rubber-like polymers (B1) are preferably prepared by emulsion polymerization.

The glass transition temperature of the rubber-like polymer (B1) of the rubber-like graft polymer (B) to be used in the present invention is defined as a peak top temperature of a tan δ curve obtained through measurement by means of a dynamic mechanical property analyzer.

More specifically, the glass transition temperature is measured in the following manner.

A test strip having a size of 3 mm (thickness)×10 mm (width)×50 mm (length) is prepared from powder of the rubber-like graft polymer (B) by means of a heat press, and the tan δ curve is obtained through measurement at a temperature elevating rate of 2° C./rain at a frequency of 10 Hz in a center bending mode by means of a dynamic mechanical property analyzer (available under the machine name of EXSTAR DMS6100 from Seiko Instrument Inc.) and the peak top temperature of the tan δ curve is defined as the glass transition temperature.

The butadiene rubber-like polymer is preferably prepared by polymerizing 50 to 100 wt % of 1,3-butadiene and 0 to 50 wt % of at least one vinyl monomer copolymerizable with 1,3-butadiene. The use of the butadiene rubber-like polymer significantly improves the impact resistance of the resulting EVOH resin composition containing the rubber-like graft polymer. Examples of the vinyl monomer copolymerizable with 1,3-butadiene include aromatic vinyl monomers such as styrene and α-methylstyrene, alkyl (meth)acrylates such as methyl (meth)acrylate and ethyl (meth)acrylate, and (meth)acrylonitrile, which may be used either alone or in combination. Polyfunctional aromatic vinyl monomers such as divinylbenzene and divinyltoluene, poly(meth)acrylates of polyalcohols such as ethylene glycol di(meth)acrylate and 1,3-butanediol di(meth)acrylate, and allyl (meth)acrylate are also usable.

In the present invention, the term "(meth)acrylate" means acrylate or methacrylate, and the term "(meth)acryl" means acryl or methacryl.

Examples of the silicone rubber-like polymer include a polyorganosiloxane rubber, and a silicone/acryl compound rubber prepared by compounding a polyorganosiloxane rubber and an acryl rubber. For improvement of the impact resistance of a thermoplastic resin composition containing the resulting graft copolymer, it is preferred to use the silicone/acryl compound rubber. The silicone/acryl compound rubber preferably contains 1 to 99 wt % of the polyorganosiloxane component and 99 to 1 wt % of the acryl rubber component (based on a total amount of 100 wt % of these components).

A preferred production method for the silicone/acryl compound rubber includes the steps of preparing a latex of the polyorganosiloxane rubber by emulsion polymerization, impregnating particles of the polyorganosiloxane rubber latex with a monomer for the acryl rubber, and polymerizing the monomer. Examples of the monomer for the acryl rubber include alkyl (meth)acrylates such as methyl (meth)acrylate, ethyl (meth)acrylate, propyl (meth)acrylate, butyl (meth)acrylate and 2-ethylhexyl (meth)acrylate.

The acryl rubber-like polymer is preferably prepared by polymerizing a (meth)acrylate or a mixture essentially containing a (meth)acrylate. Examples of the (meth)acrylate include methyl (meth)acrylate, ethyl (meth)acrylate, propyl (meth)acrylate, butyl (meth)acrylate, 2-ethylhexyl (meth)acrylate, octyl (meth)acrylate, tridecyl (meth)acrylate, ethoxyethyl (meth)acrylate, methoxytripropylene glycol (meth)acrylate, 4-hydroxybutyl (meth)acrylate, lauryl acrylate, lauryl methacrylate and stearyl methacrylate, which may be used either alone or in combination.

For improvement of the impact resistance of the EVOH resin composition containing the resulting graft copolymer, the Tg of the acryl rubber-like polymer is preferably not higher than 0° C. In order to provide an acryl rubber-like polymer having a Tg of not higher than 0° C., n-butyl acrylate, 2-ethylhexyl acrylate, octyl acrylate, lauryl (meth)acrylate or tridecyl (meth)acrylate is preferably used as the (meth)acrylate.

The acryl rubber-like polymer may be a (co)polymer obtained by polymerizing one or more monomers. Alternatively, the acryl rubber-like polymer may be an acryl compound rubber obtained by compounding two or more acryl rubber-like polymers.

For higher impact resistance at lower temperatures, preferred examples of the rubber-like polymer (B1) include butadiene rubber-like polymers and silicone rubber-like polymers.

The rubber-like graft copolymer (B) can be prepared by polymerizing the vinyl monomer (B2) in the presence of the rubber-like polymer (B1) described above.

Examples of the vinyl monomer (B2) include aromatic vinyl monomers such as styrene, α-methylstyrene and vinyltoluene, alkyl (meth)acrylates such as methyl (meth)acrylate, ethyl (meth)acrylate and n-butyl (meth)acrylate, and (meth)acrylonitrile. For the affinity for the EVOH (A), an aromatic vinyl monomer or an alkyl (meth)acrylate is preferred. These may be used either alone or in combination.

A vinyl monomer, such as ethylene glycol di(meth)acrylate, propylene glycol di(meth)acrylate, divinylbenzene or a polyfunctional methacryl-modified silicone, containing two or more unsaturated bonds in its molecule may also be used.

The vinyl monomers (B2) preferably provide a polymer having a Tg of not lower than 30° C., more preferably not lower than 60° C. If the Tg is excessively low, the resulting rubber-like graft polymer (B) is practically disadvantageous with difficulty in handing in a process sequence from a dehydration/drying step to a resin melting/mixing step because of its adhesiveness.

The vinyl monomer (B2) may have a polar functional group. Where at least one group selected from a carboxyl group, a hydroxyl group and a glycidyl group is used, the miscibility of the vinyl monomer (B2) with the EVOH (A) is improved in the presence of the polar functional group. Examples of a carboxyl-containing monomer include methacrylic acid, acrylic acid, maleic acid, fumaric acid, itaconic acid, citraconic acid, mesaconic acid, aconitic acid, methylene malonic acid and α-methylene glutaric acid. Particularly, methacrylic acid, acrylic acid or itaconic acid is preferably used. Examples of a hydroxyl-containing monomer include 2-hydroxyethyl (meth)acrylate, 2-hydroxypropyl (meth)acrylate and 4-hydroxybutyl (meth)acrylate, but are not limited to those. An example of a glycidyl-group-containing monomer is glycidyl (meth)acrylate, but is not limited to this.

The amount of the monomer containing the polar functional group is typically 1 to 40 wt %, preferably 1 to 20 wt %, based on the amount of the vinyl monomer (B2).

However, the amount of the glycidyl-group-containing monomer is typically less than 5 wt %, preferably 0 to 4 wt %, based on the amount of the vinyl monomer (B2).

The rubber-like graft polymer (B) is preferably obtained by graft-polymerizing 10 to 90 wt % of the vinyl monomer (B2) (based on a total amount of 100 wt % of the rubber-like polymer (B1) and the vinyl monomer (B2)) in the presence of 10 to 90 wt % of the rubber-like polymer (B1) (based on a total amount of 100 wt % of the rubber-like polymer (B1) and the vinyl monomer (B2)). The rubber-like graft polymer (B) is more preferably obtained by graft-polymerizing 10 to 50 wt % of the vinyl monomer (B2) in the presence of 50 to 90 wt % of the rubber-like polymer (B1). As the proportion of the rubber-like polymer (B1) is increased, the impact resistance of the EVOH (A) is improved. On the other hand, it is preferred from the viewpoint of workability that the proportion of the rubber-like polymer (B1) is not greater than 90 wt %. This makes it easy to suppress the blocking of particles of the rubber-like graft polymer (B).

A method of producing the rubber-like graft polymer (B) in the present invention is not particularly limited, but the rubber-like graft polymer (B) may be prepared by a multistage seeded emulsion polymerization method or the like by graft-polymerizing the vinyl monomer (B2) in the presence of the rubber-like polymer (B1). The graft polymerization may be multistage graft polymerization which is carried out at two or more stages. In order to improve the compatibility between the vinyl monomer (B2) and the EVOH (A), it is preferred to use the monomer containing the polar functional group as the vinyl monomer (B2) at the final stage.

The rubber-like graft polymer (B) may be separated from the rubber-like graft polymer latex produced by the aforementioned polymerization method by a freeze-thawing method or a salting-out method, and then extracted in a particulate form, in a flake form or in a powdery form by centrifugal dehydration and drying. Alternatively, the rubber-like graft polymer (B) may be extracted from the latex by a spray drying method employing a spray drier.

Further, the rubber-like graft polymer (B) thus extracted is heat-treated in an inert gas atmosphere in a drier or passed through an extruder to be heat-treated, and is dehydrated by any of various methods such as using a desiccant, whereby a carboxyl group is introduced into the vinyl monomer (B2). Further, the rubber-like graft polymer may be provided as containing carboxyl groups at least some of which are present in an anhydrous form.

Out of particles of the rubber-like graft polymer (B) produced in the aforementioned manner, particles typically having an average particle diameter of 50 to 1000 nm, preferably 80 to 750 nm, are used. The rubber-like graft polymer (B) may be of a mono-dispersion type having a particle size distribution including a single peak, or of a poly-dispersion type having a particle size distribution including a plurality of peaks.

<Description of Polyalkylene Ether Unit-Containing Polymer (C)>

The polyalkylene ether unit-containing polymer (C) to be used in the present invention is a known polymer (see JP-2006-294204-A), and may be a homopolymer or a copolymer containing a polyalkylene ether unit.

The polyalkylene ether unit-containing polymer (C) typically has a melting point of 135° C. to 195° C., preferably 145° C. to 185° C., particularly preferably 155° C. to 175° C. Further, the polyalkylene ether unit-containing polymer (C) typically has an MFR of 2 to 80 g/10 minutes, preferably 5 to 60 g/10 minutes, more preferably 20 to 50 g/10 minutes, further more preferably 25 to 45 g/10 minutes, particularly preferably 30 to 40 g/10 minutes, as measured at 230° C. with a load of 2160 g.

Examples of the polyalkylene ether unit-containing polymer (C) include homopolymers and copolymers of linear and branched aliphatic ethers such as polymethylene glycol, polyethylene glycol, poly(1,2- and 1,3-)propylene glycol, polytetramethylene glycol and polyhexamethylene glycol, and homopolymers and copolymers of alicyclic ethers such as condensation polymer of cyclohexanediol and condensation polymer of cyclohexanedimethanol. The polyalkylene ether unit-containing polymer (C) may be a random copolymer of any of these ether units.

A polyalkylene ether unit-containing block copolymer is also usable. These polyalkylene ether unit-containing polymers (C) may be used either alone or in combination.

Examples of the block copolymer include polyester-polyether block copolymers each prepared by using an aromatic polyester and a polyalkylene ether, block copolymers each prepared by using an aliphatic polyester and a polyalkylene ether, polyurethane copolymers each containing a unit of a polymer of a short chain glycol and a diisocyanate and a unit of a polymer of a diisocyanate and a polyalkylene ether, and polyamide-polyether copolymers each prepared by using a polyamide and a polyalkylene ether.

Among these polymers (C), the polyalkylene ether unit-containing block copolymers are preferred, and the polyester-polyether block copolymers each containing the aromatic polyester and the polyalkylene ether are further preferred.

A preferred example of the polyalkylene ether unit is a polytetramethylene ether glycol unit.

Although the lower limit of the proportion of the polyalkylene ether unit in the polyalkylene ether unit-containing block copolymer is not limited, the proportion is typically not less than 5 wt %, preferably not less than 10 wt %, more preferably not less than 20 wt %. Where the proportion of the polyalkylene ether unit is less than the aforementioned lower limit, the polyalkylene ether unit-containing block copolymer tends to have lower dispersibility when being blended with the EVOH (A). Although the upper limit of the proportion of the polyalkylene ether unit is not limited, the proportion is typically not greater than 90 wt %, preferably not greater than 80 wt %. The proportion of the polyalkylene ether unit in the polyalkylene ether unit-containing block copolymer is calculated based on the chemical shift and the number of hydrogen atoms determined by nuclear magnetic resonance spectroscopy (NMR).

The polyalkylene ether unit typically has a number average molecular weight of 600 to 4000, preferably 800 to 2500, particularly preferably 900 to 2100. If the number average molecular weight is excessively low, the polyalkylene ether unit-containing block copolymer tends to have a higher melting point and lower dispersibility when being blended with the EVOH (A). On the other hand, if the number average molecular weight is excessively high, the polyalkylene ether unit-containing block copolymer has a lower melting point and is liable to adhere to a hopper when being blended with the EVOH (A). Polyalkylene ether units having different number average molecular weights may be used either alone or in combination. The number average molecular weight of the polyalkylene ether unit is herein measured by gel permeation chromatography (GPC).

The polyester-polyether block copolymer containing the aromatic polyester and the polyalkylene ether is obtained by polycondensation of oligomers prepared through an esterification reaction or an ester exchange reaction by using any of $C_{2-12}$ aliphatic and/or alicyclic diols and any of aromatic dicarboxylic acids and alkyl esters of the aromatic dicarboxylic acids, and using any of polyalkylene ethers typically having a number average molecular weight of 600 to 4000.

Usable as the $C_{2-12}$ aliphatic and/or alicyclic diols are those typically used as materials for polyesters. Exemplary alkylene glycols include ethylene glycol, propylene glycol, 1,3-butylene glycol, 1,4-butanediol and 1,6-hexanediol. Examples of the alicyclic diols include 1,4-cyclohexanediol and 1,4-cyclohexanedimethanol. These diols may be used either alone or as a mixture containing two or more thereof. Among these diols, the $C_{2-12}$ aliphatic diols are preferred, and 1,4-butanediol is particularly preferred.

Usable as the aromatic dicarboxylic acids are those typically used as materials for polyesters. Examples of the aromatic dicarboxylic acids include terephthalic acid and lower alkyl esters (e.g., with an alkyl having a carbon number of not greater than 4) of terephthalic acid, isophthalic acid, phthalic acid, 2,5-norbornanedicarboxylic acid, 1,4-naphthalic acid, 1,5-naphthalic acid, 4,4-oxybenzoic acid and 2,6-naphthalenedicarboxylic acid, and lower alkyl esters of any of these dicarboxylic acids. Among these, terephthalic acid and isophthalic acid are preferred, and terephthalic acid is particularly preferred. These aromatic dicarboxylic acids may be used either alone or in combination.

That is, the polyester-polyether block copolymer containing the aromatic polyester and the polyalkylene ether is preferably a block copolymer having a polyester unit containing terephthalic acid and an aliphatic $C_{2-12}$ diol, and a polytetramethylene ether glycol unit.

The polyester-polyether block copolymer may be copolymerized with a small amount of one or two or more of trifunctional alcohols, tricarboxylic acids and/or esters of the tricarboxylic acids in addition to the aforementioned components, and any of aliphatic dicarboxylic acids such as adipic acid and dialkyl esters of the aliphatic carboxylic acids may be introduced as a comonomer into the polyester-polyether block copolymer.

The melting point of the polyester-polyether block copolymer is not limited, but is typically not lower than 125° C., preferably not lower than 140° C., more preferably not lower than 160° C. If the melting point of the polyester-polyether block copolymer is lower than the aforementioned lower limit, the resulting resin composition tends to have a lower heat resistance. The upper limit of the melting point of the polyester-polyether block copolymer is not limited, but is typically not higher than 300° C., preferably not higher than 260° C. The method of measuring the melting point of the polyester-polyether block copolymer is to measure a melting peak temperature while elevating the temperature of the copolymer at a temperature elevating rate of 10° C./min by means of a differential scanning calorimeter.

Exemplary commercially-available products of the polyester-polyether block copolymer include POLYESTER (manufactured by Nippon Synthetic Chemical Industry Co., Ltd.), PRIMALLOY (manufactured by Mitsubishi Chemical Corporation), PELPRENE (manufactured by TOYOBO Co., Ltd.) and HYTREL (manufactured by E.I. du Pont de Nemours and Company).

In the present invention, the polyalkylene ether unit-containing polymer (C) preferably contains a carboxyl group. Particularly, a carboxyl-containing polyester-polyether block copolymer (C2) is preferred, which is prepared by using a polyester-polyether block copolymer as an unmodified polymer (C1) and modifying the polyester-polyether block copolymer with a carboxyl-containing compound.

Where the polymer having the carboxyl-containing polyalkylene ether unit is used, the resin composition has remarkably improved impact resistance and an excellent low-temperature impact resistance. This may be because the matrix polymer per se has an improved impact resistance with an increased molecular weight and, at the same time, the efficiency of impact transfer from the matrix to the component (B) is increased. Next, how to prepare the polymer having the carboxyl-containing polyalkylene ether unit will be described.

The carboxyl-containing compound to be used for the preparation of the polymer having the carboxyl-containing polyalkylene ether unit by modifying the unmodified polymer (C1) is not particularly limited, but examples of the carboxyl-containing compound include unsaturated carboxylic acids and derivatives of the unsaturated carboxylic acids. Examples of the derivatives include acid anhydrides, esters, acid halides, amides and imides, among which acid anhydrides are preferred. Specific examples of the carboxyl-containing compound include α,β-unsaturated carboxylic acids and unsaturated dicarboxylic acids such as acrylic acid, methacrylic acid, ethacrylic acid, maleic acid, fumaric acid, itaconic acid, citraconic acid, tetrahydrophthalic acid, crotonic acid and isocrotonic acid, and acids such as maleic anhydride, itaconic anhydride, citraconic anhydride and tetrahydrophthalic anhydride. Among these, the acid anhydrides are preferred, and maleic anhydride is particularly preferred. These carboxyl-containing compounds may be used either alone or in combination.

That is, the carboxyl-containing polyester-polyether block copolymer (C2) is preferably a polyester-polyether block copolymer having a carboxyl-containing aromatic polyester and a polyalkylene ether. Particularly, an acid anhydride modification product of the block copolymer having the polyester unit containing terephthalic acid and the $C_{2-12}$ aliphatic diol and the polytetramethylene ether glycol unit is preferred.

The method of preparing the polymer having the carboxyl-containing polyalkylene ether unit by the graft-polymerization of the unmodified polymer (C1) is not limited. The polymer may be prepared simply by a thermal reaction, and a radical generator may be added during the reaction. Exemplary reaction methods include a solution modification method in which the reaction is allowed to proceed in a solvent, a melt modification method which employs no solvent, and a suspension/dispersion reaction method. Particularly, the melt modification method is preferred.

In the melt modification method, the unmodified polymer (C1) and the acid and, as required, the radical generator to be described later are preliminarily mixed together, and melted and kneaded in a kneading machine for the reaction. Alternatively, the unmodified polymer (C1) is melted in the kneading machine and a mixture of the acid and the radical generator dissolved in a solvent is added to the unmodified polymer (C1) from an inlet port for the reaction. For the mixing, a Henschel mixer, a ribbon blender or a V-type blender is typically used for the mixing. A single screw or twin screw extruder, a roll, a Banbury mixer, a kneader or a Brabender mixer may be used for the melt kneading. The melt-kneading temperature may be properly set within a temperature range in which the polymer (C) is free from thermal degradation.

The blend amount of the acid is typically not less than 0.01 parts by weight, preferably not less than 0.05 parts by weight, more preferably not less than 0.1 parts by weight, and typically not greater than 30 parts by weight, preferably not greater than 5 parts by weight, more preferably not greater than 1 parts by weight, based on 100 parts by weight of the unmodified polymer (C1). If the blend amount of the acid is excessively small, it is impossible to sufficiently modify the unmodified polymer (C1). With an excessively small number of functional groups, the dispersibility of the unmodified polymer (C1) is liable to be reduced when being blended with the EVOH (A). If the blend amount is excessively great, a part of the compound not undergoing the grafting reaction will remain, leading to poorer appearance.

The radical generator is not limited, but examples of the radial generator include organic and inorganic peroxides such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanoyl peroxide, t-butyl peroxybenzoate, benzoyl peroxide, m-toluoyl peroxide, dicumyl peroxide, 1,3-bis(t-butylperoxyisopropyl)benzene, dibutyl peroxide, methyl ethyl ketone peroxide, potassium peroxide and hydrogen peroxide, azo compounds such as 2,2'-azobisisobutyronitrile, 2,2'-azobis(isobutyramide)dihalides, 2,2'-azobis[2-methyl-N-(2-hydroxyethyl)propionamide] and azodi-t-butane, and carbon radical generators such as dicumyl.

According to the type of the unmodified polymer (C1) to be subjected to the graft modification reaction, the type of the acid and the conditions for the modification, the radical generator may be properly selected from the aforementioned radical generators, which may be used either alone or in combination.

The blend amount of the radical generator is typically not less than 0.001 parts by weight, preferably not less than 0.005 parts by weight, more preferably not less than 0.01 parts by weight, and typically not greater than 3 parts by weight, preferably not greater than 0.5 parts by weight, more preferably not greater than 0.2 parts by weight, particularly preferably not greater than 0.1 parts by weight, based on 100 parts by weight of the unmodified polymer (C1). If the blend amount of the radical generator is excessively small, the modification tends to insufficiently occur. If the blend amount of the radical generator is excessively great, the unmodified polymer (C1) tends to have a significantly reduced molecular weight (a significantly reduced viscosity), thereby reducing the material strength.

The modification percentage (graft amount) of the polymer having the carboxyl-containing polyalkylene ether unit is typically not less than 0.01 wt %, preferably not less than 0.03 wt %, more preferably not less than 0.05 wt %, and typically not greater than 10 wt %, preferably not greater than 7 wt %, more preferably not greater than 5 wt %. If the graft amount is excessively small, the polymer tends to have a poorer dispersibility with a smaller number of functional groups when being blended with the EVOH (A). If the graft amount is excessively great, the material strength is liable to be reduced due to a lower molecular weight during the modification. The modification percentage (graft amount) can be determined based on spectrum obtained by $^1$H-NMR measurement.

A commercially available product of the polymer having the carboxyl-containing polyalkylene ether unit may be used, and a specific example thereof is PRIMALLOY (manufactured by Mitsubishi Chemical Corporation) which is a carboxyl-containing polyester-polyether block copolymer.

<Description of Resin Composition>

The resin composition according to the present invention is a resin composition prepared by mixing the EVOH (A), the rubber-like graft polymer (B) and the polyalkylene ether unit-containing polymer (C). A composition containing only the EVOH (A) and the rubber-like graft polymer (B) needs improvement in impact resistance. By blending the polymer (C) in the composition, however, remarkable effects can be provided, i.e., the resin composition has excellent ordinary-temperature impact resistance and low-temperature impact resistance. This may be because the matrix polymer per se has an improved impact resistance with an increased molecular weight and the efficiency of the impact transfer from the matrix to the rubber-like graft polymer (B) is increased.

The base resin of the inventive resin composition is the EVOH (A). Therefore, the amount of the EVOH (A) is typically 50 to 90 wt %, preferably 60 to 85 wt %, particularly preferably 70 to 80 wt %, based on the overall amount of the resin composition. If the amount of the EVOH (A) is excessively great, the impact resistance is liable to be reduced. If the amount of the EVOH (A) is excessively small, the gas barrier property and the solvent resistance are liable to be reduced.

The weight ratio (A/B) between the EVOH (A) and the rubber-like graft polymer (B) in the inventive resin composition is typically 70/30 to 99/1, preferably 75/25 to 97/3, particularly preferably 80/20 to 95/5. If the weight ratio (A/B) is excessively great, the impact resistance is liable to be reduced. If the weigh ratio (A/B) is excessively small, the gas barrier property is liable to be reduced.

The weight ratio (B/C) between the rubber-like graft polymer (B) and the polyalkylene ether unit-containing polymer (C) is typically 0.1 to 10, preferably 0.3 to 5, particularly preferably 0.8 to 2. If the weight ratio (B/C) is excessively great, the low-temperature impact resistance is liable to be reduced. If the weight ratio (B/C) is excessively small, the solvent resistance is liable to be reduced.

The weight ratio (A/C) between the EVOH (A) and the polyalkylene ether unit-containing polymer (C) in the inventive resin composition is typically 70/30 to 99/1, preferably 75/25 to 95/5, particularly preferably 80/20 to 90/10. If the weight ratio (A/C) is excessively great, the impact resistance is liable to be reduced. If the weigh ratio (A/C) is excessively small, the gas barrier property is liable to be reduced.

The inventive resin composition may contain other thermoplastic resin in addition to the EVOH (A), the rubber-like graft polymer (B) and the polyalkylene ether unit-containing polymer (C) according to the use purpose, as long as the effects of the present invention are not impaired. Where the other thermoplastic resin is contained, it is preferred that the amount of the other thermoplastic resin is typically less than 5 wt % based on the overall amount of the resin composition.

The inventive resin composition may contain other components according to the use purpose, as long as the effects of the present invention are not impaired. The total amount of these components is typically less than 20 wt % based on the amount of the resin composition. Examples of the other components include a glycidyl-group-containing (meth)acrylate polymer, an ionomer, a rubber component, fillers such as talc, calcium carbonate, mica and glass fibers, a plasticizer such as paraffin oil, an antioxidant, a heat stabilizer, a light stabilizer, a UV absorber, a neutralizing agent, a lubricant, an antifogging agent, an antiblocking agent, a slip agent, a crosslinking agent, a crosslinking assisting agent, a colorant, a flame retarder, a dispersant, an antistatic agent, an antibacterial agent and a fluorescent brightener, which may be optionally added either alone or in combination to the resin composition.

In order to enhance the effects of the present invention and improve the melt stability and the like, it is particularly preferred to add one or two or more of hydrotalcite compounds, hindered phenol heat stabilizers, hindered amine heat stabilizers and metal salts of higher aliphatic carboxylic acids (e.g., calcium stearate, magnesium stearate and the like) in an amount of 0.01 to 1 wt % to the resin composition.

For the enhancement of the effects of the present invention and the improvement of the interlayer adhesion and the compatibility of the resin composition, it is also effective to add an alkali metal salt containing alkali metal ions such as lithium ions, sodium ions or potassium ions. Specific examples of the alkali metal compound include lower aliphatic carboxylates such as sodium acetate and potassium acetate having a carbon number of 2 to 7, higher aliphatic carboxylates such as sodium stearate and potassium stearate having a carbon number of 8 to 22, aromatic carboxylates such as sodium benzoate and potassium benzoate, phosphates such as sodium phosphate and lithium phosphate, and metal complexes such as ethylenediamine sodium tetraacetate, which may be used either alone or in combination.

The lower aliphatic carboxylates such as sodium acetate and potassium acetate having a carbon number of 2 to 7, and the higher aliphatic carboxylates such as sodium stearate and potassium stearate having a carbon number of 8 to 22 are preferred. The higher aliphatic carboxylates such as sodium stearate and potassium stearate having a carbon number of 8 to 22 are more preferred, and potassium salts of higher aliphatic carboxylic acids having a carbon number of 8 to 22 are particularly preferred.

The amount of the alkali metal compound is typically 0.0001 to 1 parts by weight, preferably 0.0003 to 0.5 parts by weight, more preferably 0.0005 to 0.1 parts by weight, further more preferably 0.001 to 0.05 parts by weight, on a metal basis (on a weight basis) based on 100 parts by weight of the EVOH (A). Where the EVOH (A) preliminarily contains the alkali metal compound as described above, it is preferred that the total amount of the alkali metal compounds falls within the aforementioned range.

Particularly, the inventive resin composition preferably further contains a glycidyl-group-containing (meth)acrylate polymer (D) together with the components (A) to (C).

<Description of Glycidyl-Group-Containing (Meth)acrylate Polymer (D)>

The polymer (D) typically contains not less than 5 wt % of a glycidyl-group-containing (meth)acrylate unit. Where the proportion of the glycidyl-group-containing (meth)acrylate unit in the polymer (D) is not less than 5 wt %, it is possible to reduce the blend amount of the polymer (D). This facilitates the control of the compatibility between the polymer (D) and the EVOH (A), and permits the resulting resin composition to properly exhibit the impact resistance and the gas barrier property. The proportion of the glycidyl-group-containing (meth)acrylate unit in the polymer (D) is preferably not less than 20 wt %.

The polymer (D) typically has an epoxy equivalent of 50 to 5000 g/eq, preferably 100 to 4800 g/eq, particularly preferably 150 to 4500 g/eq. If the epoxy equivalent is excessively high or excessively low, the impact resistance is liable to be reduced.

In the present invention, the epoxy equivalent is determined by a method including the following steps (1) to (6):
(1) putting 2 g of hydrochloric acid in a 100 ml measuring flask, and diluting hydrochloric acid to 100 ml with a methanol/dioxane solution of methanol/dioxane=20/80 (Liquid A);
(2) precisely weighing out 0.15 to 0.20 g of a sample in a 100 ml Erlenmeyer flask with a stopper, adding 20 ml of dioxane into the flask, and applying ultrasonic waves to the resulting mixture for about 1 hour by means of an ultrasonic cleaning machine to dissolve the sample in dioxane at a liquid temperature of about 40° C.;
(3) adding 10 ml of the liquid A into the Erlenmeyer flask after the sample is dissolved;
(4) titrating the sample solution obtained after the addition of the liquid A with a 0.1 mol/l KOH (ethanol) solution with the use of phenolphthalein as an indicator;
(5) titrating a blank liquid at the same time; and
(6) calculating the epoxy equivalent based on the amount of the sample and the amounts of the KOH solution required for the titration of the sample solution and the blank liquid.

The glycidyl-group-containing (meth)acrylate unit to be used is not particularly limited, as long as it is a methacrylate and/or an acrylate containing a glycidyl group. From the viewpoint of industrial availability and polymerization stability, glycidyl acrylate or glycidyl methacrylate is preferred. The glycidyl (meth)acrylates may be used either alone or in combination.

The polymer (D) may contain other monomer unit in addition to the glycidyl-group-containing (meth)acrylate unit. Examples of the other monomer include alkyl (meth)acrylates such as methyl(meth)acrylate, ethyl (meth)acrylate, propyl (meth)acrylate, butyl (meth)acrylate and 2-ethylhexyl (meth)acrylate, cyclohexyl (meth)acrylate, phenyl (meth)acrylate, aromatic vinyl monomers such as styrene, α-methylstyrene and vinyltoluene, and (meth)acrylonitrile.

These monomers may be used either alone or in combination. Among these monomers, methyl methacrylate is preferred.

The proportion of the other monomer unit in the polymer (D) is typically not greater than 95 wt %, particularly preferably 80 wt %. With the proportion of the other monomer unit being set below the aforementioned value, it is possible to easily control the compatibility between the polymer (D) and the EVOH (A) and permit the resulting resin composition to properly exhibit the impact resistance and the gas barrier property even if the amount of the polymer (D) is reduced.

The polymer (D) may be such that a surface of the polymer defining an interface with the other component typically contains the glycidyl-group-containing (meth)acrylate unit in a proportion of not less than 5 wt % and, like the component (B), may have a rubber-like graft polymer structure obtained by polymerizing the vinyl monomer in the presence of the rubber-like polymer. In this case, the rubber-like polymers listed for the component (B1) may be used as the rubber-like polymer, and the vinyl monomer may be a vinyl monomer typically containing the glycidyl-group-containing (meth)acrylate unit in a proportion of not less than 5 wt %.

The Tg of the polymer (D) typically ranges from 0° C. to 150° C. Where the Tg of the polymer (D) is not lower than 0° C., the handling ease (the antiblocking property and the melt resistance of the polymer (B)) is improved. Where the Tg of the polymer (D) is not higher than 150° C., the polymer (D) has a higher melting speed when being blended with the EVOH (A). For the handling ease and the melting speed, the Tg of the polymer (D) is preferably not lower than 30° C. and not higher than 90° C.

The Tg of the polymer (D) is defined as the Tg of a copolymer calculated from the FOX equation expressed by the following expression (1):

$$1/Tg = \Sigma(Wi/Tgi) \quad (1)$$

(wherein Wi is the weight ratio of a monomer i based on the total weight of monomers, Tgi is the Tg of a homopolymer of the monomer i.)

A value of the Tg of the homopolymer found in POLYMER HANDBOOK THIRD EDITION (WILEY INTERSCIENCE) may be herein used.

From the viewpoint of the polymerization, the weight average molecular weight of the polymer (D) is typically 10,000 to 100,000, preferably 20,000 to 80,000.

In the present invention, the average molecular weight is determined under the following measurement conditions by gel permeation chromatography (GPC) based on a calibration curve determined with the use of a polymethyl methacrylate having a known molecular weight.
Column: TSK-Gel SUPER HZM-M (manufactured by Tosoh Corporation)
Measurement temperature: 40° C.
Eluent: Tetrahydrofuran (THF)
Eluent flow rate: 0.6 ml/min
Detector: RI For easy handling and easy blending with the EVOH (A), the polymer (D) is preferably provided in a spherical particle form.

Exemplary polymerization methods for the polymer (D) include known polymerization methods such as bulk polymerization, solution polymerization, suspension polymerization and emulsion polymerization, among which the suspension polymerization is preferred because the polymer can be easily provided in a spherical particle form.

Exemplary polymerization initiators to be used for the polymerization for the polymer (D) include azo compounds such as 2,2'-azobisisobutyronitrile, 2,2'-azobis(2-methylbutyronitrile) and 2,2'-azobis(2,4-dimethylvaleronitrile), organic peroxides such as benzoyl peroxide, lauroyl peroxide, t-butylperoxy-2-ethylhexanoate, t-hexylperoxy-2-ethylhexanoate, 1,1,3,3-tetramethylbutylperoxy-2-ethylhexanoate and t-hexylhydroperoxide, inorganic peroxides such as hydrogen peroxide, sodium persulfate and ammonium persulfate, which may be used either alone or in combination. Among these, 2,2'-azobis(2,4-dimethylvaleronitrile) is preferred.

In the polymerization for the polymer (D), a chain transfer agent may be used as required. Examples of the chain transfer agent include mercaptans such as n-dodecylmercaptan, thioglycolates such as octyl thioglycolate, and α-methylstyrene dimer, which may be used either alone or in combination. Among these, n-dodecylmercaptan is preferred.

Exemplary dispersants to be used for the suspension polymerization for the polymer (D) include less water-soluble inorganic compounds such as calcium phosphate, calcium carbonate, aluminum hydroxide and silica powder, nonionic polymer compounds such as polyvinyl alcohols, polyethylene oxides and cellulose derivatives, and anionic polymer compounds such as alkali metal poly(meth)acrylates, alkali metal salts of copolymers of (meth)acrylic acid and methyl (meth)acrylate, and copolymers of alkali metal (meth)acrylate, methyl (meth)acrylate and alkali metal (meth)acrylate sulfate, which may be used either alone or in combination.

In the present invention, remarkable impact resistance can be provided by further blending the polymer (D).

The blend amount of the glycidyl-group-containing (meth)acrylate polymer (D) is typically 0.1 to 20 parts by weight, preferably 0.1 to 15 parts by weight, particularly preferably 1 to 5 parts by weight, more preferably 2 to 5 parts by weight, based on 100 parts by weight of the EVOH (A). If the blend amount is excessively great or excessively small, it tends to be impossible to efficiently provide the impact resistance improving effect.

The blend amount of the glycidyl-group-containing (meth)acrylate polymer (D) is typically 0.1 to 50 parts by weight, preferably 0.5 to 40 parts by weight, particularly preferably 10 to 35 parts by weight, based on 100 parts by weight of the rubber-like graft polymer (B). If the amount is excessively great or excessively small, it tends to be impossible to efficiently provide the impact resistance improving effect.

The inventive resin composition preferably contains an ionomer (E) or the components (D) and (E) together with the components (A) to (C). In the presence of the ionomer (E), unexpected remarkable effects are provided, i.e., the inventive resin composition is excellent in flexural modulus, tensile strength and tensile elongation. This may be because ionic crosslinking between ionomer molecules imparts the resin composition with toughness.

Although the ionomer (E) having no gas barrier property is blended as the resin component, the gas barrier property of the resin composition is not reduced. This may be because the rubber-like graft polymer (B) and the ionomer (E) are moderately compatibilized with each other to make it possible to efficiently disperse the respective components in the EVOH (A) serving as the matrix.

<Description of Ionomer (E)>

The ionomer (E) to be used in the present invention is a thermoplastic resin which has a hydrophobic polymer main chain and side chains having ionic groups. Examples of the ionomer (E) include sulfate ionomers such as ionomers of polystyrene sulfate (PSS) and ionomers of ethylene sulfate, and ionomers of ethylene-unsaturated carboxylic acid copolymer, which may be used either alone or in combination.

In the present invention, any of the ionomers of ethylene-unsaturated carboxylic acid copolymer is preferably used because of their affinities for the EVOH (A).

The ionomers of ethylene-unsaturated carboxylic acid copolymer each have a structure such that some or all of carboxyl groups in a random copolymer of ethylene and an unsaturated carboxylic acid are neutralized with metal ions.

Examples of the unsaturated carboxylic acid include (meth)acrylic acid, maleic acid, fumaric acid, maleic anhydride, monomethyl maleate and monoethyl maleate, which may be used either alone or in combination. Among these, (meth)acrylic acid is particularly preferred.

The amount of the ethylene component in the ionomer of ethylene-unsaturated carboxylic acid random copolymer is typically 50 to 99 wt %, preferably 60 to 95 wt %. The amount of the unsaturated carboxylic acid component is typically 1 to 50 wt %, preferably 15 to 40 wt %.

The ionomer of ethylene-unsaturated carboxylic acid copolymer may contain a small amount (e.g., less than 20 wt %) of other copolymerizable monomer. Examples of the monomer include vinyl esters such as vinyl acetate, and unsaturated (meth)acrylates such as methyl (meth)acrylate, ethyl (meth)acrylate, isobutyl (meth)acrylate, n-butyl (meth)acrylate and isooctyl (meth)acrylate.

Examples of the metal ions to be used for the neutralization of the carboxyl groups in the ethylene-unsaturated carboxylic acid copolymer include monovalent metal ions such as of lithium, sodium, potassium, rubidium and cesium, divalent metal ions such as of calcium, magnesium, iron and zinc, and trivalent metal ions such as of iron and aluminum. Particularly, potassium and sodium are preferred because of their versatility. The amount of the metal cations in the ionomer (E) is typically 0.4 to 4 mol, preferably 0.6 to 2 mol, per 1 kg of the ionomer (E). The degree of the neutralization of the unsaturated carboxylic acid of the copolymer component with the metal cations is 15 to 80%, preferably 20 to 60%.

That is, the ionomer (E) is preferably a neutralization product of an ethylene-(meth)acrylic acid copolymer neutralized with metal ions in the present invention.

The ethylene-unsaturated carboxylic acid copolymer can be prepared by random copolymerization of comonomers by a known polymerization method, for example, under higher-temperature and higher-pressure conditions.

The ionomer (E) typically has a melting point of 70° C. to 120° C., preferably 80° C. to 110° C., particularly preferably 85° C. to 95° C. The ionomer (E) typically has an MFR of 0.05 to 100 g/10 minutes, preferably 0.1 to 10 g/10 minutes, particularly preferably 0.5 to 1.5 g/10 minutes, as measured at 190° C. with a load of 2160 g.

The blend amount of the ionomer (E) is typically 0.1 to 30 parts by weight, preferably 0.1 to 20 parts by weight, particularly preferably 1 to 6 parts by weight, more preferably 2 to 5 parts by weight, based on 100 parts by weight of the EVOH (A). If the blend amount is excessively great or excessively small, it tends to be impossible to efficiently provide the impact resistance improving effect.

The blend amount of the ionomer (E) is typically 0.1 to 60 parts by weight, preferably 0.5 to 50 parts by weight, particularly preferably 10 to 40 parts by weight, based on 100 parts by weight of the rubber-like graft polymer (B). If the blend amount is excessively great or excessively small, it tends to be impossible to efficiently provide the impact resistance improving effect.

An exemplary commercially-available product of the ionomer (E) is HIMILAN manufactured by Du Pont-Mitsui Polychemicals Co., Ltd.) and SURLYN (manufactured by E.I. du Pont de Nemours and Company).

<Mixing Method>

A known method may be employed for mixing the EVOH (A), the rubber-like graft polymer (B) and the polyalkylene ether unit-containing polymer (C) (and other additives). Exemplary methods include melt-mixing methods such as a method in which all the components are dry-blended and melted to be mixed, and a method in which the EVOH (A) is preliminarily melted and the other components are blended in the melted EVOH (A), and a method in which the EVOH (A) is dissolved in a solvent, then blended with the other components, and precipitated with a poor solvent of the EVOH (A).

Among these methods, the melt-mixing methods are preferred which ensure homogeneous mixing with higher industrial productivity. A known machine may be used for the melt-mixing. Examples of the known machine include extruders such as a kneader-extruder, a single screw extruder and a twin screw extruder, and kneading machines such as a mixing roll, a Banbury mixer and a Plasto mill, among which the twin screw extruder is industrially preferred.

The inventive resin composition may be melt-kneaded in an extruder and then extruded into a variety of products, or may be once formed into pellets, which are in turn formed into a variety of products by a separate known processing method. For distribution/handling ease of the resin composition, the latter method is preferred.

Where the resin composition is provided in the pellet form, the pellets are typically spherical, cylindrical, cubic or cuboidal. The pellets are preferably cylindrical, and typically each have a diameter of 1 to 5 mm and a length of 1 to 5 mm.

The inventive resin composition may be formed into a variety of single layer products. For improvement of mechanical strength, however, the inventive resin composition is preferably formed into a multilayer structural body by stacking at least one or more thermoplastic resin layers formed of a thermoplastic resin other than the EVOH (A) on the layer of the inventive resin composition, and the multilayer structural body is formed into a variety of multilayer products.

Specific examples of the thermoplastic resin other than the EVOH (A) for the thermoplastic resin layers (hereinafter sometimes referred to as "other thermoplastic resin") include polyolefin resins including polyethylene resins such as linear low-density polyethylenes, low-density polyethylenes, very low-density polyethylenes, intermediate-density polyethylenes and high-density polyethylenes, polypropylene resins such as polypropylenes and copolymers of propylene and α-olefins ($C_{4-20}$ α-olefins), olefin homopolymers and copolymers such as ethylene-vinyl acetate copolymers, ionomers, ethylene-propylene (block and random) copolymers, ethylene-acrylic acid copolymers, ethylene-acrylate copolymers, polybutenes and polypentenes, and polyolefin resins in a broader sense such as obtained by graft-modifying any of these olefin homopolymers and copolymers with an unsaturated carboxylic acid or an unsaturated carboxylate, polyester resins, polyamide resins (including copolymerized polyamides), polyvinyl chlorides, polyvinylidene chlorides, acryl resins, polystyrenes, vinyl ester resins, polyester elastomers, polyurethane elastomers, chlorinated polyethylenes, chlorinated polypropylenes, and aromatic and aliphatic polyketones, and polyalcohols such as obtained by reduction of any of these polyketones. These may be used either alone or in combination.

For suppression of the reduction in the gas barrier property of the resin composition, a hydrophobic resin is preferably used. More specifically, the polyolefin resins are preferred, and the polyethylene resins and the polypropylene resins are particularly preferred.

The resin composition layer and the other thermoplastic resin layer may each include two or more layers in the multilayer structure.

Further, an adhesive resin layer may be provided between the resin composition layer and the other thermoplastic resin layer.

An exemplary material for the adhesive resin layer is a modified olefin polymer containing carboxyl groups chemically bonded to an olefin polymer (any of the polyolefin resins described above) by an addition reaction or a grafting reaction between an unsaturated carboxylic acid or an unsaturated carboxylic anhydride and the olefin polymer. Specific examples of the modified olefin polymer include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride and ethylene-vinyl acetate copolymers graft-modified with maleic anhydride, which may be used either alone or in combination. In this case, the amount of the unsaturated carboxylic acid or the unsaturated carboxylic anhydride contained in the thermoplastic resin is typically 0.001 to 3 wt %, preferably 0.01 to 1 wt %, particularly preferably 0.03 to 0.5 wt %. If the modification degree of the modification product is lower, the adhesiveness tends to be insufficient. If the modification degree is higher, the crosslinking reaction is liable to occur, thereby deteriorating the formability.

The EVOH (A), a rubber or elastomer component such as polyisobutylene or an ethylene-propylene rubber, or a resin to be used as the material for the polyolefin resin layer may be blended with any of these adhesive resins. Particularly, it is also possible to blend a polyolefin resin which is different from the polyolefin resin serving as the matrix for the adhesive resin.

The other thermoplastic resin layer and the adhesive resin layer may contain an antioxidant, an antistatic agent, a plasticizer, a lubricant, a nucleating agent, an antiblocking agent, a wax and the like, which are known to be typically blended.

The multilayer structural body may include at least one layer of the inventive resin composition, and the structure of the multilayer structural body is not particularly limited. For prevention of the reduction in the gas barrier property of the resin composition due to moisture, the resin composition layer is preferably provided as an intermediate layer.

The layered structure of the multilayer structural body typically includes 3 to 20 layers, preferably 3 to 15 layers, particularly preferably 3 to 10 layers, including resin composition layers α (α1, α2, . . . ) and other thermoplastic resin layers β (β1, β2, . . . ). Specific examples of the combination of these layers include β/α/β, α/β/α, α1/α2/β, α/β1/β2, β2/β1/α/β1/β2 and β2/β1/α/β1/α/β1/β2, but any combinations of these layers are possible.

The multilayer structural body may include a recycle layer formed from a mixture of the resin composition and a non-EVOH thermoplastic resin obtained by re-melting odd pieces and defective products occurring in the production of the multilayer structural body. Where the recycle layer is designated by R, examples of the layered structure of the multilayer structural body include β/α/R, R/β/α, β/R/α/β, β/R/α/R/β, β/α/R/α/β and β/R/α/R/α/β.

Particularly, the provision of the recycle layer is industrially advantageous in that a great amount of scrap occurring in the forming process can be effectively utilized.

In the multilayer layered structure of the inventive multilayer structural body, the resin composition layer preferably serves as a layer to be brought into contact with a content wrapped with the multilayer structural body, and the layer of the thermoplastic resin other than the EVOH (preferably, the polyolefin resin layer) is preferably present outward of the layer which is brought into contact with the content. The multilayer structural body may be a combination of an inner layer of the resin composition, an adhesive resin layer and an outer layer of the other thermoplastic resin, a combination of an inner layer of the resin composition, an adhesive resin layer, a recycle layer and an outer layer of the other thermoplastic resin, a combination of an inner layer of the resin composition, an adhesive resin layer, a layer of the other thermoplastic resin, a recycle layer and an outer layer of the other thermoplastic resin, or a combination of an inner layer of the resin composition, an adhesive resin layer, a layer of the other thermoplastic resin, an adhesive layer and an outer layer of the other thermoplastic resin. The most preferable multilayer structure is the combination of the inner layer of the resin composition, the adhesive resin layer and the outer layer of the other thermoplastic resin.

The multilayer structural body typically has an overall thickness of 20 to 50000 μm, particularly preferably 100 to 20000 μm, for mechanical strength. If the overall thickness of the multilayer structural body is excessively small, the impact resistance and the gas barrier property are often liable to be reduced. If the overall thickness of the multilayer structural body is excessively great, the impact resistance and the gas barrier property are excessively increased, leading to uneconomical use of unnecessary materials.

The thicknesses of the respective layers in the multilayer structure depend on the layered structure, the use purpose, the shape of a container, the required physical properties and the like, but may be, for example, as follows. Where at least one of the resin composition layer, the adhesive resin layer and the other thermoplastic resin layer includes two or more layers, the following thickness values are the total thickness of the same type of layers.

The resin composition layer typically has a thickness of 5 to 500 μm, preferably 20 to 300 μm, particularly preferably 100 to 200 μm. If the resin composition layer is excessively thin, it tends to be difficult to provide the effects of the present invention. If the resin composition layer is excessively thick, the workability is liable to be reduced.

The other thermoplastic resin layer typically has a thickness of 100 to 6000 μm, preferably 200 to 4000 μm, particularly preferably 1000 to 2000 μm. If the other thermoplastic resin layer is excessively thin, the impact resistance is liable to be reduced. If the other thermoplastic resin layer is excessively thick, the workability is liable to be reduced.

The adhesive resin layer typically has a thickness of 2 to 100 μm, preferably 5 to 50 μm, particularly preferably 20 to 40 μm.

The thickness ratio between the resin composition layer and the other thermoplastic resin layer is typically 0.002 to less than 1, preferably 0.005 to less than 1, particularly preferably 0.05 to 0.2, and the thickness ratio between the resin composition layer and the adhesive resin layer is typically 1 to 250, preferably 1 to 60, particularly preferably 1 to 10.

The multilayer structural body may be stretched by a known method.

The stretching process may be performed by a known stretching method, for example, a uniaxial stretching method, a biaxial stretching method or the like. For the biaxial stretching, a simultaneous biaxial stretching method or a sequential biaxial stretching method may be employed. The stretching temperature (the temperature of the multilayer structural body measured adjacent to the multilayer structural body) is typically selected from a range of 100° C. to 300° C., preferably 100° C. to about 160° C. The stretching ratio is typically 2 to 50, preferably 2 to 20, on an area basis.

The thicknesses of the respective layers of the stretched multilayer structural body are, for example, as follows. The thickness of the resin composition layer is typically 0.1 to 1000 μm, preferably 1 to 500 μm. The thickness of the other thermoplastic resin layer is typically 0.1 to 500 μm, preferably 1 to 100 μm. The thickness of the adhesive resin layer is typically 0.1 to 250 μm, preferably 0.1 to 100 μm. The thickness ratio between the resin composition layer and the other thermoplastic resin layer is typically 0.0002 to less than 1, preferably 0.01 to less than 1, and the thickness ratio between the resin composition layer and the adhesive resin layer is 1 to 10000, preferably 2 to 5000.

EXAMPLES

The present invention will hereinafter be described more specifically by way of Examples. The present invention is not limited to these examples without departing from the scope of the present invention. In the description of Examples, "parts" and "%" are based on weight unless otherwise specified.

Example 1

An saponfied ethylene-vinyl acetate copolymer (a1) (having an ethylene content of 29 mol %, a saponification degree of 99.6 mol %, an MFR of 4 g/10 minutes (as measured at 210° C. with a load of 2160 g)) was used as the EVOH (A).

A rubber-like graft polymer (b1) (available under the trade name of MATABLEN C223A from Mitsubishi Rayon Co., Ltd. and having a glass transition temperature of rubber-like polymer of −66° C.) obtained by graft-polymerizing styrene and methyl methacrylate in the presence of a rubber-like polymer (B1) consisting essentially of butadiene was used as the rubber-like graft polymer (B).

A polymer (c1) (available under the trade name of PRIMALLOY AP GQ430 from Mitsubishi Chemical Corporation and having a melting point of 165° C., an MFR of 35 g/10 minutes (as measured at 230° C. with a load of 2160 g)) obtained by grafting maleic anhydride to a block copolymer of a polybutylene terephthalate and a polytetramethylene ether glycol by a melt-kneading method was used as the polyalkylene ether unit-containing polymer (C).

The Tg of the rubber-like polymer (B1) of the rubber-like graft polymer (B) used in the present invention was a peak top temperature of a tan δ curve obtained through measurement by means of a dynamic mechanical property analyzer. More specifically, the measurement was performed in the following manner.

A test strip having a size of 3 mm (thickness)×10 mm (width)×50 mm (length) was prepared from powder of the rubber-like graft polymer (B) by a heat press. The tan δ curve was obtained through measurement at a temperature elevating rate of 2° C./min at a frequency of 10 Hz in a center bending mode by means of a dynamic mechanical property analyzer (EXSTAR DMS6100 (machine name) manufactured by Seiko Instrument Inc.) and the peak top temperature of the tan δ curve was defined as Tg.

The weight ratio of the respective components was (a1/b1/c1)=(80/10/10). That is, the weight ratio (A/B) was 89/11, and the weight ratio (A/C) was 89/11. The weight ratio (B/C) was 1.

The EVOH (A), the rubber-like graft polymer (B) and the polymer (C) were dry-blended in the aforementioned weight ratio, and then the resulting mixture was fed into a twin screw extruder (having a diameter of 30 mm and an L/D ratio of 42) having four mixing zones, and melt-kneaded (at extruder setting temperatures of C1/C2/C3/C4/C5/C6/C7/H/D=150/200/210/230/230/230/23 0/220/220° C.). The resulting resin composition was extruded into strands, which were in turn cut into cylindrical pellets.

Then, injection-molded products were produced from the resulting resin composition pellets. In an injection molding process, a mold for the ISO 179/1eA test was used to mold a product (having a size of 80 mm (vertical dimension)×10 mm (horizontal dimension)×4 mm (thickness)) and a product (having a size of 50 mm (vertical dimension)×25 mm (horizontal dimension)×2 mm (thickness)) at a mold temperature of 30° C. at a cylinder temperature of 220° C.

Further, a 30-μm thick film and a 60-μm thick film were formed from the resulting resin composition pellets (film forming conditions were a die temperature of 220° C. and a cooling roll temperature of 80° C. with the use of a single screw extruder having an inner diameter of 40 mm, a coat hanger die and a full-flight screw).

The molded products and the films thus produced were evaluated in the following manner.

(Evaluation)

<Evaluation of Ordinary-Temperature Impact Strength>

The Charpy notched impact strength of the molded product (80 mm (vertical dimension)×10 mm (horizontal dimension)×4 mm (thickness)) was determined at 23° C. at 50% RH (in conformity with JIS K7111).

<Evaluation of Low-Temperature Impact Strength>

The Charpy notched impact strength of the molded product (80 mm (vertical dimension)×10 mm (horizontal dimension)×4 mm (thickness)) was determined at −20° C. at 0% RH (in conformity with JIS K7111).

<Evaluation of Solvent Resistance>

The molded product (50 mm (vertical dimension)×25 mm (horizontal dimension)×2 mm (thickness)) was immersed in toluene at 23° C. for 7 days, and a change in the weight of the molded product was observed. The values shown in the following tables are percentage (%) expressed by (value obtained by subtracting weight measured before immersion in toluene from weight measured after immersion in toluene)/(weight measured before immersion in toluene)×100.

<Evaluation of Oxygen Barrier Property>

The oxygen permeation amount of the 30-μm thick film was measured at a temperature of 20° C. at a relative humidity of 65% by means of Ox-Tran 2/20 available from Mocon Inc.

<Evaluation of Film Impact>

The impact strength (kgf·cm) of the 60-μm thick film was measured in a 23° C. and 50% RH atmosphere by means of a YSS film impact tester (MODEL 181 manufactured by Yasuda Seiki Seisakusho Co., Ltd.)

The thickness of the test sample was 60 μm, and the diameter was 80 mm. An iron ball having a diameter of 12.7 mm was used as an impact ball, and a load was 15 kgf·cm. An oscillator lift angle was 90 degrees.

Example 2

A saponified ethylene-vinyl acetate copolymer (a2) (having an ethylene content of 32 mol %, a saponification degree of 99.6 mol %, an MFR of 12 g/10 minutes (as measured at 210° C. with a load of 2160 g)) was used as the EVOH (A). As in Example 1, the ingredients (b1) and (c1) were used. Further, a polymer (d1) available under the trade name of MAT-ABLEN P-1900 from Mitsubishi Rayon Co., Ltd. was used as the glycidyl-group-containing (meth)acrylate polymer (D), which was obtained by polymerizing a glycidyl methacrylate unit as an essential component and had an epoxy equivalent of 158 (g/eq) and a weight average molecular weight of 48,000.

The weight ratio of the respective components (a2/b1/c1/d1) was 78/10/10/2.

That is, the weight ratio (A/B) was 89/11, and the weight ratio (A/C) was 89/11. The weight ratio (B/C) was 1. The blend amount of the polymer (D) was 3 parts by weight based on 100 parts by weight of the EVOH (A). The blend amount of the polymer (D) was 20 parts by weight based on 100 parts by weight of the polymer (B).

Further, potassium stearate was used as the higher aliphatic carboxylate in an amount of 0.05 parts by weight on a potassium metal basis, based on 100 parts by weight of the EVOH (A).

A resin composition was prepared in substantially the same manner as in Example 1, except that the EVOH (A), the rubber-like graft polymer (B), the polymer (C), the polymer (D) and potassium stearate were dry-blended in the weight ratios described above. Then, the evaluation was carried out in the same manner.

Example 3

A resin composition was prepared in substantially the same manner as in Example 2, except that sodium stearate was used instead of potassium stearate in an amount of 0.05 parts by weight on a sodium metal basis, based on 100 parts by weight of the EVOH (A). Then, the evaluation was carried out in the same manner.

Example 4

A resin composition was prepared in substantially the same manner as in Example 2, except that the weight ratio (a2/b1/c1/d1) of the respective components was 77/10/10/3. Then, the evaluation was carried out in the same manner.

That is, the weight ratio (A/B) was 89/11, and the weight ratio (A/C) was 89/11. The weight ratio (B/C) was 1. The blend amount of the polymer (D) was 4 parts by weight based on 100 parts by weight of the EVOH (A). The blend amount of the polymer (D) was 30 parts by weight based on 100 parts by weight of the polymer (B).

Example 5

A saponifed ethylene-vinyl acetate copolymer (a2) (having an ethylene content of 32 mol %, a saponification degree of 99.6 mol %, an MFR of 12 g/10 minutes (as measured at 210° C. with a load of 2160 g)) was used as the EVOH (A).

A rubber-like graft polymer (b1) (available under the trade name of MATABLEN C223A from Mitsubishi Rayon Co., Ltd. and having a glass transition temperature of rubber-like polymer of −66° C.) obtained by graft-polymerizing styrene and methyl methacrylate in the presence of a rubber-like polymer (B1) consisting essentially of butadiene was used as the rubber-like graft polymer (B).

A polymer (c1) (available under the trade name of PRIMALLOY AP GQ430 from Mitsubishi Chemical Corporation and having a melting point of 165° C., an MFR of 35 g/10 minutes (as measured at 230° C. with a load of 2160 g)) obtained by grafting maleic anhydride to a block copolymer of a polybutylene terephthalate and a polytetramethylene ether glycol by a melt-kneading method was used as the polyalkylene ether unit-containing polymer (C).

A polymer (d1) available under the trade name of MAT-ABLEN P-1900 from Mitsubishi Rayon Co., Ltd. was used as the glycidyl-group-containing (meth)acrylate polymer (D), which was obtained by polymerizing a glycidyl methacrylate unit as an essential component and had an epoxy equivalent of 158 (g/eq) and a weight average molecular weight of 48,000.

A metal ion neutralization product (e1) of an ethylene-(meth)acrylate copolymer (available under the trade name of HIMILAN 1707 from Du Pont-Mitsui Polychemicals Co., Ltd.) and having a melting point of 89° C. and an MFR of 0.9 g/10 minutes (as measured at 190° C. with a load of 2160 g) was used as the ionomer (E).

The weight ratio of the respective components was (a2/b1/c1/d1/e1)=(75/10/10/2/3).

That is, the weight ratio (A/B) was 88/12, and the weight ratio (A/C) was 88/12. The weight ratio (B/C) was 1. Further, the blend amount of the polymer (D) was 3 parts by weight based on 100 parts by weight of the EVOH (A). The blend amount of the polymer (D) was 20 parts by weight based on 100 parts by weight of the polymer (B).

A resin composition was prepared in substantially the same manner as in Example 1, except that the EVOH (A), the rubber-like graft polymer (B), the polymer (C), the polymer (D) and the ionomer (E) were dry-blended. Then, the evaluation was carried out in the same manner.

Comparative Example 1

Injection-molded products were produced in substantially the same manner as in Example 1, except that the polyalkylene ether unit-containing polymer (C) was not blended and the components (A) and (B) were used in a weight ratio (A/B) of 80/20. Then, the evaluation was carried out in the same manner.

Comparative Example 2

Injection-molded products were produced in substantially the same manner as in Example 1, except that the rubber-like graft polymer (B) was not blended and the components (A) and (C) were used in a weight ratio (A/C) of 80/20. Then, the evaluation was carried out in the same manner.

Reference Example 1

Injection-molded products were produced in substantially the same manner as in Example 1, except that the rubber-like graft polymer (B) and the polyalkylene ether unit-containing polymer (C) were not blended but only the EVOH (A) was used. Then, the evaluation was carried out in the same manner.

The components and the formulations of the resin compositions of Examples, Comparative Examples and Reference Example are shown below in Table 1, and the evaluation results are shown below in Table 2.

TABLE 1

| | | Components and formulation | | | | |
|---|---|---|---|---|---|---|
| | EVOH (A) | Rubber-like graft polymer (B) | Polyalkylene ether unit-containing polymer (C) | Glycidyl-containing (meth)acrylate polymer (D) | Ionomer (E) | Higher aliphatic carboxylate Blend amount (parts by weight) based on 100 parts by weight of EVOH |
| | | Blend ratio (on weight basis) based on total amount of components (A) to (E) | | | | |
| Example 1 | a1(80) | b1(10) | c1(10) | — | — | — |
| Example 2 | a2(78) | b1(10) | c1(10) | d1(2) | — | Potassium stearate (500) |
| Example 3 | a2(78) | b1(10) | c1(10) | d1(2) | — | Sodium stearate (500) |
| Example 4 | a2(77) | b1(10) | c1(10) | d1(3) | — | Potassium stearate (500) |
| Example 5 | a2(75) | b1(10) | c1(10) | d1(2) | e1(3) | — |
| Comparative Example 1 | a1(80) | b1(20) | — | — | — | — |
| Comparative Example 2 | a1(80) | — | c1(20) | — | — | — |
| Reference Example 1 | a1(100) | — | — | — | — | — |

TABLE 2

| | Ordinary temperature impact strength (kJ/m$^2$) | Low temperature impact strength (kJ/m$^2$) | Solvent resistance (Weight change %) | Oxygen barrier property (cc. 30 μm/ m$^2$ · day · atm) | Film impact (kgf · cm) |
|---|---|---|---|---|---|
| Example 1 | 22 | 7.9 | 0.0 | 0.3 | 7.1 |
| Example 2 | 28 | 12 | *1 | 0.4 | 8.0 |
| Example 3 | 25 | 5.7 | *1 | 0.5 | 7.9 |
| Example 4 | 29 | 11 | *1 | 0.4 | 7.9 |
| Example 5 | 120 | 16 | *1 | 0.4 | 7.8 |
| Comparative Example 1 | 16.8 | 3.3 | 0.0 | 0.6 | 5.8 |
| Comparative Example 2 | 16.6 | 5.9 | 0.0 | 0.2 | — |
| Reference Example 1 | 5.5 | 3.0 | 0.0 | 0.1 | — |

*1) No measurement data (the weight change % believed to be 0.0 in view of the data of the other examples and comparative examples).

As can be understood from the evaluation results shown in Table 2, Examples were excellent in ordinary-temperature and low-temperature impact strengths, and each had a higher film impact value. Particularly, the impact strength evaluation shows that Example 5 was very excellent in ordinary-temperature and low-temperature impact strength values.

On the other hand, Comparative Examples and Reference Example which were each lack of one of the components (A) to (C) were poorer in impact strengths than Examples. This indicates that the presence of the components (A) and (B) as well as the component (C) improved the impact strengths.

In the present invention, the ordinary-temperature and low-temperature Charpy impact strengths and the film impact are determined for the evaluation of the impact resistance. More specifically, the Charpy impact strength is determined for evaluation of the tenacity of the resin of a plate injection-molded strip, serving as an index for evaluation of defect resistance (cracking resistance). On the other hand, the film impact is determined for evaluation of puncture strength against film breakage, serving as an index for evaluation of possibility of impact defect.

In the evaluation of the solvent resistance, an excellent effect was provided, with a weight change of 0.0%, in Example 1 as in Comparative Examples and Reference Example.

Where the resin composition contains the EVOH alone, the weight change is 0.0% (see Reference Example 1 in Table 2) in the solvent resistance evaluation. Where a resin having affinity for a solvent is blended in the resin composition, it is generally supposed that the solvent resistance of the resin composition is reduced proportionally to the blend amount of the resin.

In Comparative Example 1 in which only the rubber-like graft polymer (B) was blended with the EVOH (A), the solvent resistance was excellent with a weight change of 0.0%. In Example 1 in which the polyalkylene ether unit-containing polymer (C) supposedly having affinity for a solvent was blended, the solvent resistance was unexpectedly excellent with a weight change of 0.0% as in Reference Example 1 in which the EVOH (A) was used alone.

In the evaluation of the oxygen barrier property, the resin compositions of Examples, Comparative Examples and Reference Examples each had an excellent value.

While Examples described above are directed to single layer structures each including a resin composition layer containing the EVOH (A), the rubber-like graft polymer (B) and the polyalkylene ether unit-containing polymer (C), multilayer structural bodies each including the resin composition layer provide effects comparable to or higher than those of Examples described above.

In a conceivable multilayer structural body, for example, the resin composition layer is provided at least as an inner layer, i.e., as a layer to be brought into contact with a content of a container, and a layer of a thermoplastic resin other than the EVOH (A) is provided as an outer layer outward of the inner layer. Where the layer of the thermoplastic resin other than the EVOH (A) is a polyolefin resin layer, the polyolefin resin layer improves the low-temperature impact strength, suppresses intrusion of moisture into the container from the outside of the container, and suppresses the reduction in the oxygen barrier property of the EVOH (A) (the matrix of the resin composition layer), which may otherwise occur due to the moisture. That is, the provision of the polyolefin resin layer as the outer layer of the multilayer structural body improves the low-temperature impact strength and suppresses the reduction in oxygen barrier property with time, while maintaining the solvent resistance.

While the present invention has been described by way of the specific examples, these examples are merely illustrative of the invention, but not limitative of the invention. Modifications falling within the equivalent scope of the claims are deemed to fall within the scope of the present invention.

Although specific forms of embodiments of the instant invention have been described above in order to be more clearly understood, the above description is made by way of example and not as a limitation to the scope of the instant invention. It is contemplated that various modifications apparent to one of ordinary skill in the art could be made without departing from the scope of the invention As can be understood from the above results, the resin composition containing the EVOH (A), the rubber-like graft polymer (B) and the polyalkylene ether unit-containing polymer (C), and the multilayer structural body having the layer of the resin composition have excellent oxygen barrier property and solvent resistance comparable to those of the known prior art composition, and are unexpectedly more excellent in low-temperature impact resistance than the known prior art composition. Therefore, the resin composition and the multilayer structural body according to the present invention are useful as materials for containers such as bottles, tanks and drums for fuels, agricultural agents and other solutions containing volatile substances, and hoses and the like for transporting these liquids.

The invention claimed is:

1. A resin composition comprising:
   (A) a saponified ethylene-vinyl ester copolymer having an ethylene content of 20 to 60 mol %;
   (B) a rubber-like graft polymer; and
   (C) a polyalkylene ether unit-containing polymer,
   wherein a weight ratio (B/C) between the rubber-like graft polymer (B) and the polyalkylene ether unit-containing polymer (C) is 0.1 to 10.

2. The resin composition according to claim 1, wherein the polyalkylene ether unit-containing polymer (C) is a polyester-polyether block copolymer.

3. The resin composition according to claim 1, wherein the polyalkylene ether unit-containing polymer (C) contains a carboxyl group.

4. The resin composition according to claim 1, wherein a weight ratio (A/B) between the saponified ethylene-vinyl ester copolymer (A) and the rubber-like graft polymer (B) is 70/30 to 99/1.

5. The resin composition according to claim 1, wherein a weight ratio (A/C) between the saponifed ethylene-vinyl ester copolymer (A) and the polyalkylene ether unit-containing polymer (C) is 70/30 to 99/1.

6. The resin composition according to claim 1, wherein the rubber-like graft polymer (B) is a graft polymer prepared by graft-polymerizing 10 to 90 wt % of a vinyl monomer (B2) in the presence of 10 to 90 wt % of a rubber-like polymer (B1) based on a total amount of 100 wt % of the rubber-like polymer (B1) and the vinyl monomer (B2).

7. The resin composition according to claim 6, wherein the rubber-like polymer (B1) has a glass transition temperature of not higher than 0° C.

8. The resin composition according to claim 1, further comprising a glycidyl-group-containing (meth)acrylate polymer (D).

9. The resin composition according to claim 8, wherein the glycidyl-group-containing (meth)acrylate polymer (D) has an epoxy equivalent of 50 to 5000 g/eq.

10. A multilayer structural body comprising at least one layer made of the resin composition according to claim 1.

11. The multilayer structural body according to claim 10, which has an overall thickness of 20 to 50000 µm.

* * * * *